(12) United States Patent
Lallemant et al.

(10) Patent No.: US 9,574,523 B2
(45) Date of Patent: Feb. 21, 2017

(54) FLUID FLOW VALVE, PARTICULARLY FOR A MOTOR VEHICLE, AND A TEMPERATURE REGULATION DEVICE INCLUDING ONE SUCH VALVE

(71) Applicant: Valeo Systemes de Controle Moteur, Cergy Saint Christophe (FR)

(72) Inventors: Mathieu Lallemant, Maisons-Laffitte (FR); Franck Girardon, Conflans Sainte Honorine (FR); Patrick Lebrasseur, Montagny En Vexin (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 106 days.

(21) Appl. No.: 14/401,131

(22) PCT Filed: May 7, 2013

(86) PCT No.: PCT/FR2013/051018
§ 371 (c)(1),
(2) Date: Nov. 14, 2014

(87) PCT Pub. No.: WO2013/171410
PCT Pub. Date: Nov. 21, 2013

(65) Prior Publication Data
US 2015/0107691 A1      Apr. 23, 2015

(30) Foreign Application Priority Data
May 15, 2012 (FR) ..................................... 12 54435

(51) Int. Cl.
*F16K 11/072* (2006.01)
*F02M 25/07* (2006.01)
(Continued)

(52) U.S. Cl.
CPC ...... *F02M 25/0729* (2013.01); *F02B 29/0418* (2013.01); *F02B 29/0475* (2013.01);
(Continued)

(58) Field of Classification Search
CPC ... F16K 5/0407; F16K 11/072; F02B 29/0418; Y10T 137/6579; Y10T 137/87531; Y10T 137/86863
(Continued)

(56) References Cited

U.S. PATENT DOCUMENTS 3,048,191 A * 8/1962 Crang .................. F16K 5/0407
                                                            137/625.32
3,471,021 A    10/1969 Prizler
(Continued)

FOREIGN PATENT DOCUMENTS

DE          19860637 A1 *  7/2000 ............ F16K 11/072
DE   10 2008 005 591 A1    7/2009
EP         1 363 013 A1   11/2003

OTHER PUBLICATIONS

International Search Report for corresponding International Application No. PCT/FR2013/051018, mailed Jul. 29, 2013 (3 pages).

*Primary Examiner* — Michael R Reid
*Assistant Examiner* — Christopher Ballman
(74) *Attorney, Agent, or Firm* — Osha Liang LLP

(57) ABSTRACT

The invention relates to a fluid flow valve, particularly for a motor vehicle. Said fluid flow valve comprises a body (2), capable of having said fluid pass therethrough; and a sealing means (3), placed in said body, capable of occupying different angular positions by rotation of said sealing means (3) relative to said body (2). Said sealing means (3) is configured so as to enable, in a first angular position, the fluid to pass from a first inlet (6) to a first outlet (21) of the valve and from a second inlet (22) to a second outlet (7) of the valve, (Continued)

and, in a second angular position, to enable the fluid to pass from the first inlet (6) to the second outlet (7) through the body (2). Said sealing means (3) is also configured so as to ensure a gradual closing of the first inlet (6).

16 Claims, 5 Drawing Sheets

(51) Int. Cl.
*F02B 29/04* (2006.01)
*F16K 11/085* (2006.01)
*F16K 11/10* (2006.01)

(52) U.S. Cl.
CPC ............ *F02M 26/26* (2016.02); *F02M 26/71* (2016.02); *F16K 11/072* (2013.01); *F16K 11/085* (2013.01); *F16K 11/10* (2013.01); *Y02T 10/146* (2013.01); *Y10T 137/6579* (2015.04); *Y10T 137/87249* (2015.04)

(58) Field of Classification Search
USPC .............................. 137/340, 601.17, 625.46
See application file for complete search history.

(56) References Cited

U.S. PATENT DOCUMENTS

| 4,506,697 A * | 3/1985 | Marchant ............ F16K 11/0856 137/240 |
| 5,152,321 A | 10/1992 | Drager et al. |
| 5,207,246 A | 5/1993 | Meyer |
| 2010/0253094 A1* | 10/2010 | Russberg ................ F04B 13/02 290/1 R |
| 2011/0023838 A1* | 2/2011 | Tschaler ................ Y02T 10/121 123/568.2 |
| 2011/0095647 A1* | 4/2011 | Russberg .............. F16K 11/076 310/306 |

* cited by examiner

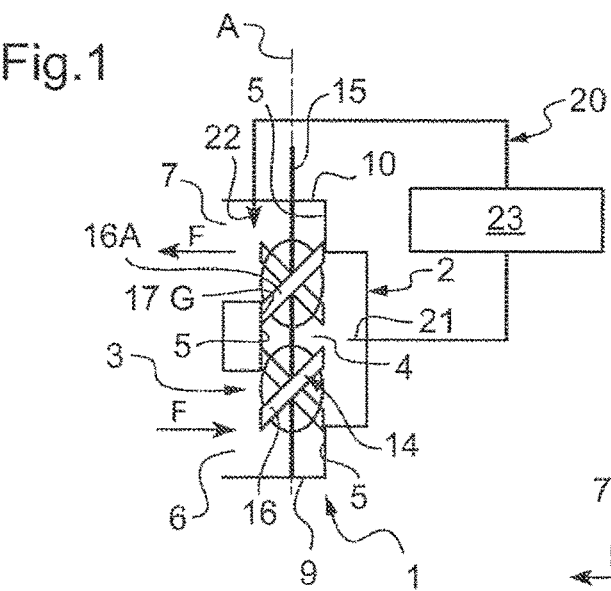
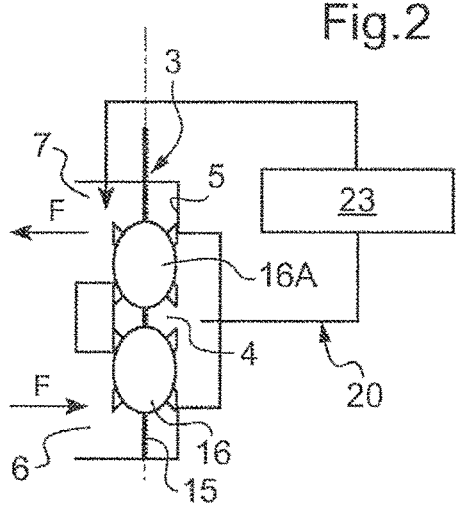
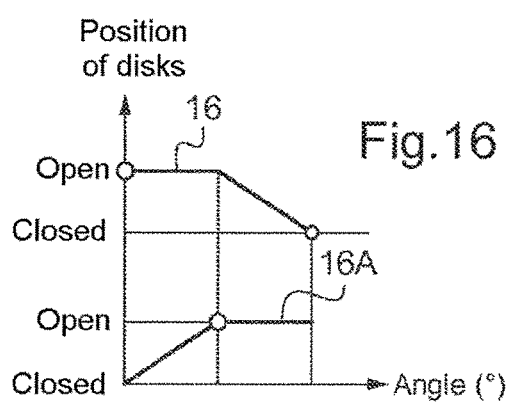

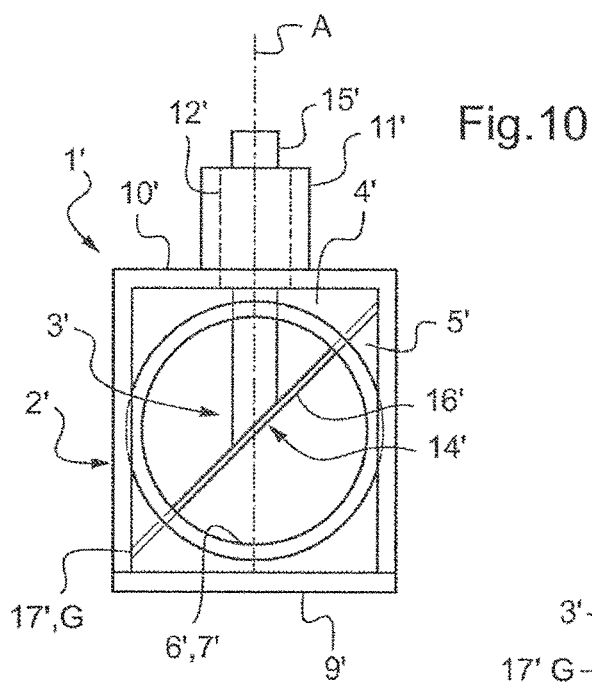
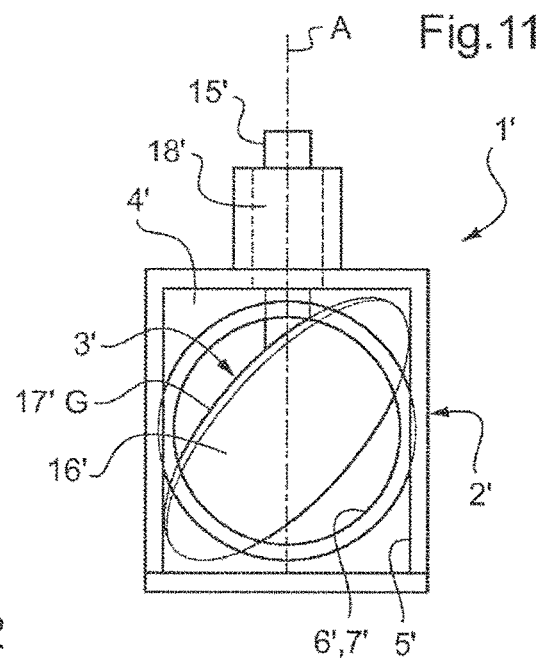
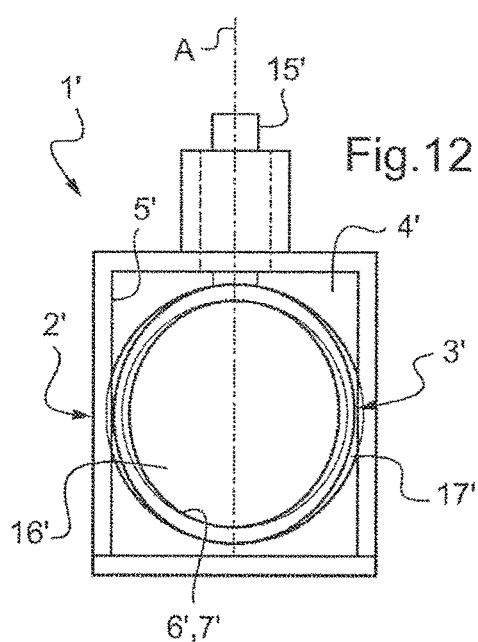
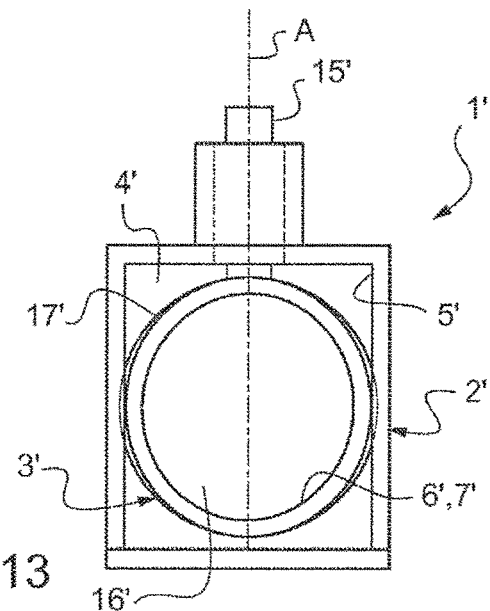

FLUID FLOW VALVE, PARTICULARLY FOR A MOTOR VEHICLE, AND A TEMPERATURE REGULATION DEVICE INCLUDING ONE SUCH VALVE

The present invention relates to a fluid flow valve designed more particularly but not exclusively to equip fluid flow systems associated with internal combustion engines, whether petrol or Diesel, of vehicles, in particular motor vehicles.

Such valves may have various functions and, for example, when they are provided on Diesel turbocharged engines, they may be used to meter the quantity of air supplied to the intake line of the engine or to divert a portion of the exhaust gases circulating in the exhaust line and to forward said gases in the direction of the intake line, in particular for the purpose of treating the nitrogen oxides. In this case, the gases are called recirculated exhaust gases. The valves according to the invention thus relate, in particular, to valves permitting the flow of gas.

In recirculated exhaust gas circuits, it is known to use heat exchangers, called recirculated exhaust gas coolers, permitting the temperature of said gases to be lowered. However, in certain operating modes, it is not necessary to cool the exhaust gases. It is thus important to be able to circulate the gases to the intake line of the engine without passing via the heat exchanger. To this end, the recirculated exhaust gas circuits comprise a cooled line provided with the heat exchanger and a non-cooled line by-passing the cooled line.

Thus recirculated exhaust gas circuits are known, said circuits comprising a first valve permitting the quantity of recirculated exhaust gas to be metered and a second valve permitting the gases to be directed to the cooled line or to the non-cooled line. It is understood that such circuits have drawbacks in that they require two separate valves.

A similar situation is encountered in the intake lines of the engine. More specifically, in said intake lines, it is known to use charge air coolers. However, in certain operating modes, it is not necessary to cool the intake gases. It is thus important to be able to circulate the gases to the engine without passing via the cooler. To this end, the intake gas circuits comprise a cooled line provided with the charge air cooler and a non-cooled line by-passing the cooled line.

Thus circuits for supplying air to the engine are known, said circuits comprising a first valve permitting the quantity of intake gas to be metered and a second valve permitting the gases to be directed to the cooled line or to the non-cooled line. It is understood that such circuits also have drawbacks in that they require two separate valves.

The object of the present invention is to remedy these drawbacks and relates to a fluid flow valve, particularly for a motor vehicle, comprising a body capable of being traversed by said fluid and a sealing means which is arranged in said body and which is able to occupy different angular positions by the rotation of said sealing means relative to said body.

According to the invention, said sealing means is configured so as to permit, in a first angular position, the fluid to pass from a first inlet to a first outlet of the valve and from a second inlet to a second outlet of the valve and, in a second angular position, to permit the fluid to pass from the first inlet to the second outlet through the body. Said sealing means is further configured to ensure the gradual closing of the first inlet.

In this manner the valve according to the invention permits a plurality of ways of circulating fluid simply by rotating the sealing means.

The valve may be configured so that the first inlet and the second outlet are of circular section.

The sealing means may be configured so that its lateral wall has a thickness which is less than the largest transverse dimension of the opening forming one of the first inlet and the second outlet. The lateral wall extends, for example, about the axis of rotation of the sealing means.

According to different embodiments of the invention which could be considered together or separately:
- said sealing means is configured so as to ensure said gradual closing of the first inlet from said second angular position,
- said sealing means is configured so as to leave open a passage through said body between the first outlet and the second inlet, during the gradual closing of said first inlet,
- said body comprises a cylindrical internal housing, of circular cross section and said sealing means comprises two sealing parts arranged in a plane which is inclined relative to said cylindrical housing and cooperating with the lateral wall of said housing by a peripheral generatrix so as to ensure a sealed contact between the sealing means and the body in at least two angular positions,
- said sealing parts each comprise an inclined part, located in parallel with one another and axially offset along the axis (A) of the housing,
- said inclined parts of the sealing means are shaped in the form of a rotating disk, the peripheral edge thereof constituting the generatrix in contact with the lateral wall of the cylindrical housing, so as to ensure a cylinder-to-cylinder contact,
- the inclined parts form an angle of substantially 45° with the axis (A) of the cylindrical housing of the body,
- said sealing means comprises a control rod which is connected to said inclined parts to drive said parts in rotation, said control rod being arranged in the axis of said cylindrical housing passing via the center of said inclined parts,
- said rod and said inclined parts are produced in one piece,
- said inclined parts are driven simultaneously in rotation by said control rod,
- said first outlet is located axially between said first inlet and said second outlet,
- said first inlet, said first outlet and/or said second outlet are radial,
- said first inlet and said second outlet are arranged in parallel with one another on the same side of said body,
- said first inlet and said second outlet are diametrically opposite said first outlet,
- said second inlet is located in the region of an axial end of the body, provided in the vicinity of one of said inclined parts, located opposite said second outlet,
- said second inlet for fluid is axial.

The invention further relates to a temperature regulation device comprising a valve as described above.

Said device further comprises, for example, a heat exchanger, connected between said first outlet and said second inlet in the region of a so-called cooled line.

In this manner, the valve according to the invention makes it possible to bypass said cooled line when it is in said second angular position or even during the gradual closing of said first inlet. Thus it is possible to implement both a diversion of the cooled line and a metering of the fluid.

Different applications are possible. In particular:
said exchanger is configured so as to be a recirculated exhaust gas exchanger and said valve is configured so as to be a recirculated exhaust gas valve, or
said exchanger is configured so as to be a charge air cooler and said valve is configured so as to be an air metering valve.

Different embodiments of the invention will be described hereinafter with reference to the accompanying figures which will clearly illustrate how the invention may be implemented. In these figures, identical reference numerals denote the same elements.

FIGS. 1, 2 and 3 are schematic plan views of a valve and a regulation device according to the invention, said valve being illustrated in three respective operating positions.

FIGS. 9 and 10 show a transparent view, in perspective, of the valve of FIG. 4 with the rotating sealing means in an open position at +90° and −90° respectively.

FIGS. 11 to 13 show respectively in cross section, the positions of the rotating sealing means in the open positions of 45°, 5° and the closed positions of 0° or 180° of the valve of FIG. 4.

FIG. 16 is a graph showing the laws of opening of the valve of FIGS. 1 to 3.

Figure 4:
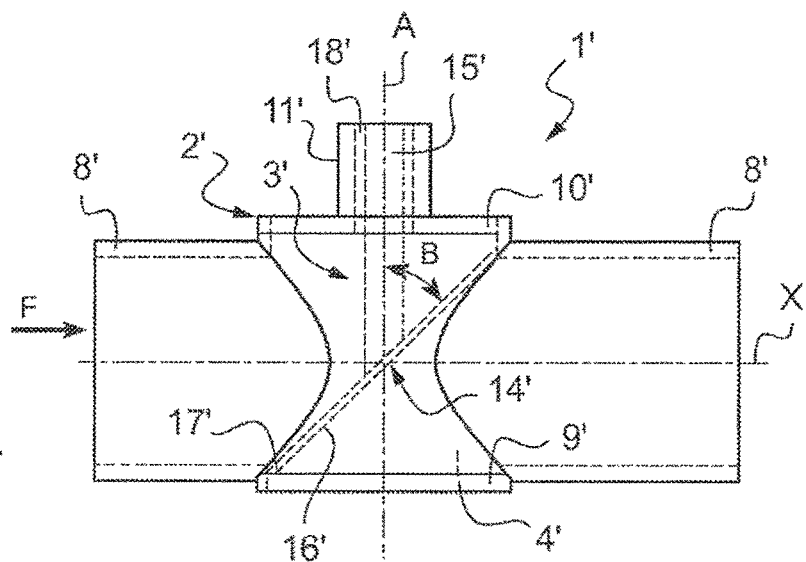

As illustrated in FIGS. 1 to 3, the invention relates to a valve 1 for the flow of a fluid F, particularly for a motor vehicle, comprising a body 2, capable of being traversed by said fluid, and a sealing means 3 arranged in said body 2. Said sealing means 3 may occupy different angular positions, by the rotation of said sealing means relative to said body 2.

According to the invention, said sealing means 3 is configured so as to permit, in a first angular position of said sealing means 3, the fluid to pass from a first inlet 6 to a first outlet 21 of the valve and from a second inlet 22 to a second outlet 7 of the valve, as illustrated in FIG. 1.

Said valve is also configured so as to permit, in a second angular position, the fluid to pass from the first inlet 6 to the second outlet 7 via the body 2, as illustrated in FIG. 2.

Said sealing means is further configured so as to ensure a gradual closing of the first inlet, as illustrated in FIG. 3, which corresponds to an angular position in which said first inlet 6 is located in the fully closed situation.

Said sealing means 3 in this case is configured so as to ensure said gradual closing of the first inlet 6 from said second angular position.

Said sealing means 3 could also be configured so as to leave open a passage through said body 2 between the first outlet 21 and the second inlet 22, during the gradual closing of said first inlet 6. The fluid thus flows directly from the first inlet 6 to the second outlet 7 during the entire operating phase.

Said body 2 in this case comprises a cylindrical internal housing 4 of circular cross section.

According to a first embodiment, not illustrated, said sealing means could comprise a cylindrical plug valve, provided with passages for fluid which are in correspondence, or not in correspondence, with the first and/or second inlets and/or the first and/or second outlets, as a function of its different angular positions.

According to a further embodiment, said sealing means 3 comprises two sealing parts 14 arranged in a plane which is inclined relative to said cylindrical housing and cooperating with the lateral wall 5 of said housing by a peripheral generatrix so as to ensure a sealed contact between the sealing means 3 and the body 2 in at least two angular positions. More specifically, in said first angular position, a first of said sealing portions 14, in this case the upper sealing portion, ensures a sealed contact with the body 2 and, in the fully closed angular position of the first inlet 6, the other sealing portion, in this case the lower sealing part, ensures a sealed contact with the body 2.

Said sealing parts each comprise, for example, an inclined part 16, 16A, located in parallel with one another axially offset along the axis (A) of the housing 4. A first of the inclined parts 16 is in this case the lower inclined part and the other inclined part 16A is in this case the upper inclined part.

Said inclined parts 16, 16A of the sealing means 3 are shaped in the form of a rotating disk, the peripheral edge thereof 17 constituting the generatrix in contact with the lateral wall 5 of the cylindrical housing, so as to ensure a cylinder-to-cylinder contact.

The inclined parts 16, 16A in this case form an angle of substantially 45° with the axis (A) of the cylindrical housing of the body 4.

Said sealing means 3 further comprises a control rod 15 which is connected to said inclined parts 14 to drive said parts in rotation, said control rod 15 being arranged in the axis of said cylindrical housing 4 passing via the center of said inclined parts 16, 16A.

Said rod 15 and said inclined parts 14 could be produced in one piece.

The valve 1' shown in the FIGS. 4 to 15 is a simplified valve designed to illustrate more clearly the operating principle of the embodiment according to the invention, cited above, in a configuration with a single inclined portion 16'.

Figure 5:
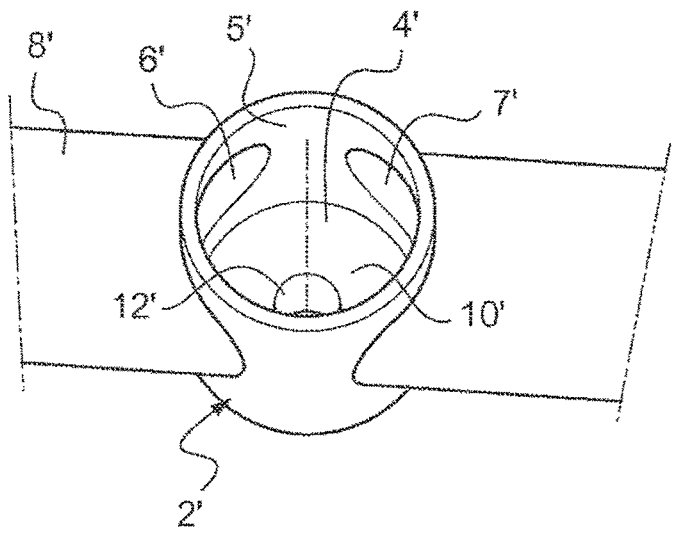
FIG. 5 is an external plan view of a valve of simplified type, designed to illustrate more clearly the operation of the valve according to the invention as illustrated in FIGS. 1 to 3 above.
Figure 6:
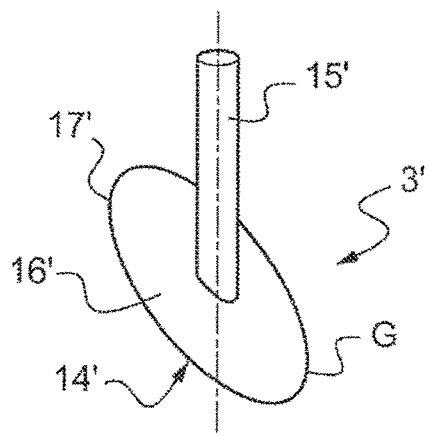
FIG. 6 shows in perspective the body of the valve of FIG. 4.

As in the embodiment of the invention cited above, said valve 1' of the FIGS. 4 to 15 comprises two essential components, namely a body 2' (FIG. 5) and a sealing means 3' (FIG. 6). In particular, the body 2' of the valve 1' is provided with an internal housing 4' which is cylindrical, having an axis A and being of circular section, and which is defined by a lateral wall 5'. This internal housing may be likened to a bore. An inlet 6' and an outlet 7', forming two lines for the fluid designed to flow through the housing of the valve, discharge into the wall of said internal housing radially to the axis A. Here, and in this case contrary to the invention, said inlet 6' and outlet 7' are aligned relative to one another. They have in this case a longitudinal axis X perpendicularly intersecting the axis A of the housing 2' and have identical diameters. They extend beyond the lateral wall 5' of the housing by means of pipes 8' integrated in the body 2' and designed for connecting to the circuit equipped with said valve.

Figure 7:
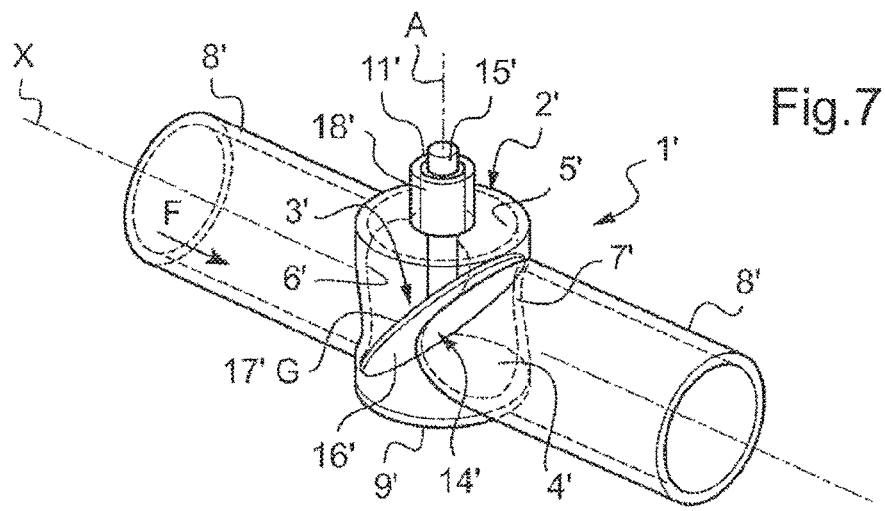
FIG. 7 shows in perspective the rotating sealing means of the valve of FIG. 4.

It may also be seen in FIGS. 4, 5 and 7 that the cylindrical internal housing 4' is completely closed by a transverse base 9' at one of its ends, whilst located at its opposing end is a transverse cover 10' extended by an end piece 11' with an axial hole 12'. Said axial hole is traversed by the sealing means 3' which cooperates with a drive device, not shown, controlled by a control unit known per se to drive the sealing means 3' in rotation about the axis A.

As may be seen more clearly with reference to FIGS. 6 and 7, said sealing means according to the invention has an inclined sealing part 14' and a connecting rod 15'. In particular, the inclined part 14' is shaped in the form of an elliptical shutter 16' arranged in a plane which is inclined relative to the axis A of the circular cylindrical housing 2' and centered on said axis A, so that its peripheral edge 17' is in constant contact with the lateral wall 5' of the housing 4' so as to isolate the inlet 6' and the outlet 7' in at least one given angular position of the sealing means in order to interrupt the fluid flow or to place in fluidic communication the inlet 6' and the outlet 7', with an adjustable flow rate according to the angular opening provided to the sealing shutter. This peripheral edge 17' thus constitutes a generatrix G which is always in sealed contact with the lateral wall 5' of the housing.

"Inclined" is understood to be strictly between 0° and 90°. "Shutter" is understood as a part having two surfaces which are inclined relative to the axis A and connected by the peripheral edge 17'. Said inclined surfaces may be parallel to one another. The part has a small thickness, namely a distance between said inclined surfaces which is much less than the diameter of the body 2', in particular ten times less. The part is, for example, a disk.

Geometric considerations are taken into account to ensure the correct operation of the valve 1'. The shutter 16' has an elliptical shape having a large axis which is greater than the diameter of the circular housing 4' and having a small axis which is substantially less than the diameter of the circular housing 4'. The connecting rod 15' is arranged along the axis A of the housing so as to be centered on the inclined disk, with the angle B between the inclined plane of the disk and the axis A, in this case equal to 45°. To achieve a constant contact with the lateral wall 5' of the housing, the large axis of the disk 16' is thus substantially equal to the diameter of the housing multiplied by $\sqrt{2}$. This contact may be defined as being a cylinder-to-cylinder contact between the wall 5' of circular section of the housing 4' and the generatrix G corresponding to the peripheral edge 17' of the inclined disk 16' and which is circular in projection on a plane perpendicular to the axis of rotation of the shutter.

It is noteworthy that the mounting of the sealing means 3' in the housing 4' of the body of the valve does not require any fine adjustment operation, and only the axial abutment of the means 3' in the housing is required in order to center the disk 16' relative to the inlet and outlet of fluid.

The rod 15' is attached by one of its ends to the disk 16' by assembly or overmolding, or it is molded with the disk so as to achieve a one-piece sealing means 3'. By way of example, the disk 16' may be made of plastics and the rod 15' may be made of metal or vice versa, or the two elements may be made of plastics material or metal according to the one-piece design or selected composite. The other end of the rod passes through the axial hole 12' of the end piece 11' via a guide bearing 18' and is connected to the device for driving in rotation, not shown.

In the position illustrated with reference to FIGS. 7 and 13, the inclined disk 16' of the sealing means 3 isolates the inlet 6' from the outlet 7' preventing the flow of fluid through the valve 1'. To achieve this, it may be seen that the peripheral edge 17' of the inclined disk 16' cooperates sealingly and fully with the lateral wall 5' of the cylindrical housing 4', in the manner of a partition separating the housing into two separate and sealed internal chambers, each facing one of the inlet 6' and outlet 7' lines for the passage of fluid. This angular position of the inclined disk 16' and thus of the sealing means 3' corresponds to a closure of the valve 1' with, as a point of departure, a zero angular rotation of 0° of the sealing means 3, the drive device thereof via the rod 15' being inactive.

Figure 8:
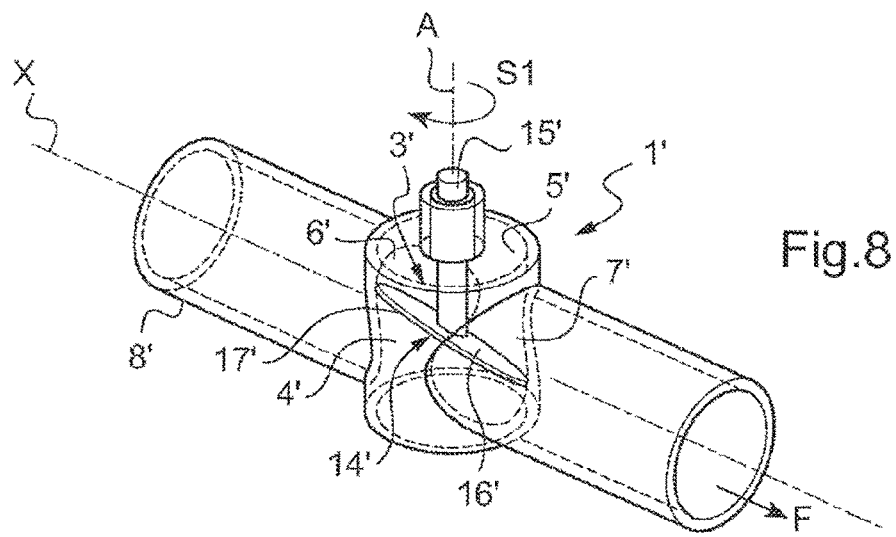
FIG. 8 shows a transparent view, in perspective, of the valve of FIG. 4 with the sealing means mounted in the body of the valve and in a closed position thereof.

When the drive device is acted upon, it causes the rotation of the sealing means 3' according to the desired angle, corresponding to a determined flow rate of fluid through the valve 1'. With reference to FIGS. 8 and 10, the sealing means 3', via its rod 15' is subjected to a rotation of +90° in the clockwise direction S1 about the axis A, whilst the inclined disk 16' has been rotated in the housing 4' so as to be located in a plane substantially parallel to the coaxial pipes 8' defining the inlet 6' and outlet 7' of the body 2' of the valve. Following the rotation, the peripheral edge 17' is no longer in complete contact with the lateral wall 5' of the housing but only partially, since the opposing parts of the edge 17' are located opposite the circular inlet and outlet 6' and 7'. This retracted angular position of the disk permits the passage of fluid between the inlet 6' and the outlet 7' via the sealed internal housing 4' of the body, and corresponds to a complete opening of the valve 1' for which the flow rate for the flow of fluid is at a maximum.

Figure 9:
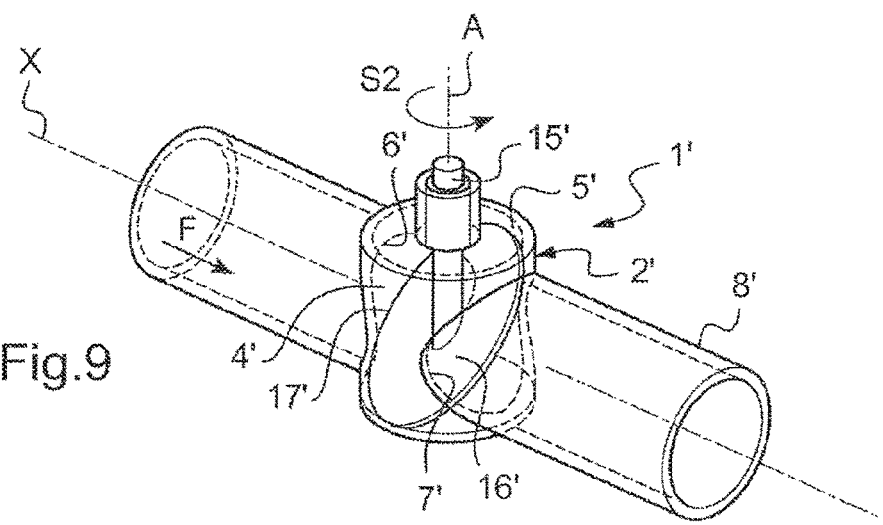

The position occupied by the inclined disk 16' and shown with reference to FIG. 9 is symmetrical to that before, i.e. the sealing means has been rotated by the action of the drive device by −90° in the counterclockwise direction S2 relative to the closed position of 0°. Thus, the inclined disk 16' is located parallel to the coaxial inlet 6' and outlet 7' of the fluid, ensuring a maximum flow rate through the valve. Thus it is possible to make the valve 1' operate in both directions from a central closed position.

An intermediate position of the sealing means 3' is illustrated by way of example with reference to FIG. 8, which position corresponds to a rotation of +45° of the inclined disk 16' about the axis A. The edge 17' of the disk is thus partially opposite the inlet 6' and the outlet 7', placing in communication said inlet and outlet for the passage of fluid at an average flow rate.

With reference to FIG. 9, it shows that the edge 17' of the inclined disk 16' is fully in contact with the lateral wall 5' of the housing when the sealing means is located approximately 5° from the initial closed position of 0°. This means that the complete overlap of the disk 16' and the housing 4' makes it possible to accept an angular error during assembly without reducing the level of sealing of the valve. The closure of the valve is finally obtained over an angular range of approximately 10° (+ or −5°).

It is also noted that, due to the design of the inclined disk in a cylindrical housing with cylinder-to-cylinder contact, the closed position of the valve may be reached either by the return of the sealing means 3' by a reverse rotation, or by carrying out an additional rotation to bring the disk into the closed position. The inclined disk may thus be advantageously used on either side, due to the fact that only its peripheral edge makes contact with the lateral wall of the housing. A further advantage of this type of valve, and which in turn also applies to the invention, is that the position of the inclined part(s) 16', 16, 16A relative to the control rod makes it possible to reduce the interference between said rod and said inclined parts, in contrast to the shutters of the prior art which are located in the plane of their drive axis, which causes numerous sealing problems, in particular in the region of the passage of the shaft into the body of the valve.

The graphs of FIGS. 11 and 12 show clearly the position of the inclined disk 16' according to the height (mm) of the lateral wall 5' of the housing, which wall of 360° is developed by −180° to +180° to be shown in plan view.

Figure 14:
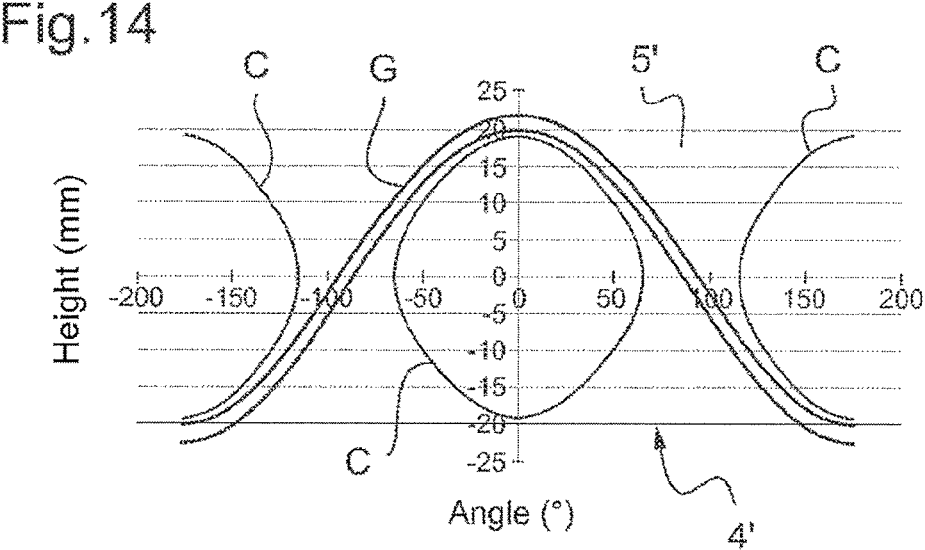
FIGS. 14 and 15 show graphs respectively representing the contact area of the disk of the rotating sealing means in the maximum closed and open positions on the housing of the body of said valve of FIG. 4, illustrated in plan view.

In FIG. 14, the inclined disk 16' of the sealing means 3' occupies the closed position of the valve 1' (FIGS. 7 and 13), i.e. with a zero rotation of said means. Relative to the inlet 6' and the outlet 7' illustrated by the contour C of the pipes 8' defining said inlet and outlet, it is clearly seen that the peripheral edge 17' forming the generatrix G of the disk, shown in plan view along a sinusoidal path, is constantly in contact with the lateral wall 5' of the housing. In this manner, the closure of the valve is complete, the inlet 6' and the outlet 7' being fully isolated from one another, which prevents any flow of fluid through the valve 1.

Figure 15:
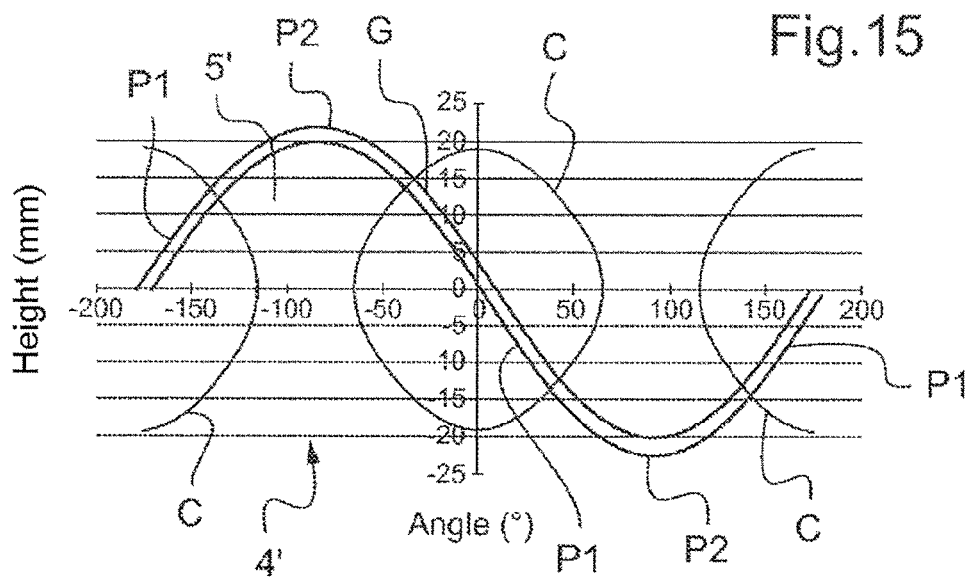

With reference to FIG. 15, the inclined disk 16' occupies fully open positions of the valve (FIGS. 8, and 10), i.e. with a rotation of +/−90° of the sealing means 3'. In this case, it is clearly seen that the peripheral edge 17' in the form of a sinusoidal path (offset by Π/2 relative to FIG. 11) primarily passes (reference P1) via the inlet and outlet 6' and 7', in the center thereof. Only the other part (reference P2) of the edge 17' remains in contact with the lateral wall 5' of the housing, which shows clearly the complete opening of the valve 1' for a maximum fluid flow rate through said valve.

As a result, such a valve ensures the seal in both directions of closure by adapting the inclined disk in the circular housing (cylinder-to-cylinder contact). Moreover, as the edge of the disk is displaced in a linear manner on the cylindrical wall, this makes it possible to avoid fouling between the disk and the wall and to ensure self-cleaning of the valve. These advantages are also provided by the valve according to the invention, in the embodiment cited with reference to FIGS. 1 to 3, in which it may be observed that the features in question are also present.

If reference is now made once again to FIGS. 1 to 3, it is observed that, in the case of the invention, said first outlet 21 is now located axially between said first inlet 6 and said second outlet 7. In this case, said first inlet 6 is located in the vicinity of a transverse base 9 closing the body 2 at one of its ends, whilst a transverse cover 10 is located at its opposing end, the second outlet 7 being located in the vicinity thereof.

Said cover 10 is traversed by the sealing means 3 which cooperates with a drive device, not shown, controlled by a control unit known per se to drive the sealing means 3 in rotation about the axis A.

Said first inlet 6, said first outlet 21 and said second outlet 7 are, for example, radial. Said first inlet 6 and said second outlet 7 could also be arranged in parallel with one another, on the same side of said body 2. Said first inlet 6 and said second outlet 7 are in this case diametrically opposed to said first outlet 21.

Said second inlet 22 is located in this case in the region of one axial end of the body 2, provided in the vicinity of one 16A of said inclined parts, located opposite said second outlet 7. Said second inlet 22 is located, in particular in the illustrated example, in the region of the cover 10. Said second inlet could be oriented axially.

Thus, the first fluid inlet 6 is located upstream of the first inclined part 16, the first outlet 21 is located downstream of said first inclined part 16 and upstream of said second inclined part 16A, the second inlet 22 is located downstream of said second inclined part 16A and/or the second outlet 7 is located downstream of the second inclined part 16A.

In other words, compared to the simplified embodiment of FIGS. 4 to 15, the valve 1 according to the embodiment of FIGS. 1 to 3, according to the invention, comprises a second inclined disk 16A arranged in series with the initial (first) inclined disk 16, in the housing 4 along the axis A. It is understood thereby that the disks 16, 16A are located one after the other or one below the other along the axis A. In particular, the two inclined disks 16, 16A are controlled by the same rod 15, connected to the device for driving the sealing means 3 in rotation, and they are arranged in the internal housing 4. For the purpose of guiding and centering, the rod is thus mounted in bearings in the region of the opposing transverse bases 9 and 10 of the body. In the wall 5 of the housing are provided the first inlet 6 and the second outlet 7 which are no longer arranged along the same axis but in parallel in a plane passing via the axis A, with the inlet 6 opposite the disk 16, for example, and the outlet 7 opposite the disk 16A. A cooled line 20 comprising a cooler 23 is connected by means of the first outlet 21, located in this case axially between the two disks, and by means of the second inlet 22, located in this case downstream of the disk 16A.

In terms of operation, as already indicated, the valve is configured so as to permit a flow of fluid along the axis A of the housing in at least one angular position of the sealing means, namely the second angular position, and in at least one further angular position of the sealing means, namely the first angular position, to permit a flow in the cooled line 20 connected to the internal housing of the body, respectively between the two inclined parts of the sealing means and downstream of the second inclined part. More specifically, when the two inclined disks 16 and 16A of the sealing means 3 are controlled so as to occupy the position illustrated in FIG. 1, the disk 16 is in its opening range, whilst the disk 16A is in the closed position, the peripheral edge 17A thereof being fully in contact with the wall 5 of the housing 4. Thus, the fluid from the first inlet 6 reaches the housing passing through the disk 16 and then, as the other disk 16A is closed, enters the bypass loop 20 by means of the first outlet 21 and traverses the cooler 23. Then, the fluid emerges cooled from said cooler 23 and enters once again the valve 1 via the second inlet 22 to be directed to the outlet 7 of the valve which permits, in this position, the cooling of the fluid.

When the two inclined disks 16 and 16A controlled by the same rod 15 are pivoted by 90° relative to the axis A of the housing, in FIG. 2, they are both open so as to allow the fluid to pass directly via the housing which then creates a bypass line without passing via the cooled line 20. The pressures at the inlet and the outlet of said cooled line 20 are thus the same, with no flow on the inside.

When the two inclined disks 16 and 16A are pivoted further by 90°, one disk 16A remains in its opening range, whilst the other disk 16 adopts its closed position by sealing, via its edge 17 in full contact with the lateral wall 5, the inlet of fluid in the housing of the body of the valve. The pressures at the inlet and outlet of the cooled line 20 are once again the same so that there is no flow of fluid. The valve 1 is in the stopped position.

It should be noted that, in contrast to the disk 16' of the simplified valve of FIGS. 4 to 15, the disks 16, 16A of the embodiment according to the invention cited above only have one closed position instead of two, the closed position of one being located at 180° from the closed position of the other.

The diagram of FIG. 16 summarizes the behavior of the control valve with its two inclined sealing disks.

For a position of the sealing means at 0°, corresponding to said first angular position, the disk 16 is open and the disk 16A is closed such that the fluid from the first inlet 6 passes at 100% via the cooled line 20.

For a position at 90°, the two disks are open but the cooled line 20 is not used as there is the same pressure between the inlet and the outlet of said line; the fluid circulates at 100% via the internal line of the housing 4, without cooling.

For a position at 180°, the disk 16 is closed so that the air does not enter the valve; the position of the other disk 16A is thus not relevant.

The position between 90° and 180° corresponds to the portion for variable metering of the fluid.

The invention claimed is:

1. A fluid flow valve for a motor vehicle, comprising:
a body capable of being traversed by said fluid; and
a sealing means which is arranged in said body the sealing means being configured to occupy different angular positions by the rotation of said sealing means relative to said body,
wherein the sealing means:
permits, in a first angular position, the fluid to pass from a first inlet to a first outlet of the valve and from a second inlet to a second outlet of the valve and, in a second angular position, to permit the fluid to pass from the first inlet to the second outlet through the body, and
ensures the gradual closing of the first inlet;
wherein the sealing means includes a first inclined part and a second inclined part, and
wherein the first inlet is located upstream of the first inclined part, the first outlet is located downstream of the first inclined part and upstream of the second inclined part, the second inlet is located downstream of the second inclined part, and the second outlet is located downstream of the second inclined part.

2. The valve as claimed in claim 1, wherein said gradual closing of the first inlet is ensured by the sealing means when the sealing means is in said second angular position.

3. The valve as claimed in any one of claims 1, wherein said sealing means is configured so as to leave open a passage through said body between the first outlet and the second inlet, during the gradual closing of said first inlet.

4. The valve as claimed in claim 1, wherein said body comprises a cylindrical internal housing of circular cross section and said sealing means comprises two sealing parts arranged in a plane which is inclined relative to said cylindrical housing and cooperating with the lateral wall of said housing by a peripheral generatrix so as to ensure a sealed contact between the sealing means and the body in at least two angular positions.

5. The valve as claimed in claim 4, wherein said inclined parts are located in parallel with one another and are axially offset along the axis of the housing.

6. The valve as claimed in claim 5, wherein said sealing means comprises a control rod which is connected to said inclined parts to drive said parts in rotation, said control rod being arranged in the axis of said cylindrical housing passing via the center of said inclined parts.

7. The valve as claimed in claim 6, wherein said rod and said inclined parts are produced in one piece.

8. The valve as claimed in claim 5, wherein said first outlet is located axially between said first inlet and said second outlet.

9. The valve as claimed in claim 5, wherein said first inlet, said first outlet and/or said second outlet are radial.

10. The valve as claimed in claim 5, wherein said first inlet and said second outlet are arranged in parallel with one another on the same side of said body.

11. The valve as claimed in claim 5, wherein said first inlet and said second outlet are diametrically opposite said first outlet.

12. The valve as claimed in claim 5, wherein said second inlet is disposed on an axial end of the body and located opposite to said second outlet with regard to one of the inclined parts.

13. A regulation device for fluid comprising a valve as claimed in claim 1.

14. The device as claimed in claim 13, further comprising a heat exchanger connected between said first outlet and said second inlet by way of a cooled line.

15. The device as claimed in claim 14, wherein one of said exchanger is configured so as to be a recirculated exhaust gas exchanger and said valve is configured so as to be a recirculated exhaust gas valve, or
said exchanger is configured so as to be a charge air cooler and said valve is configured so as to be an air metering valve.

16. A fluid flow valve for a motor vehicle, comprising:
a body capable of being traversed by said fluid; and
a sealing means which is arranged in said body the sealing means being configured to occupy different angular positions by the rotation of said sealing means relative to said body,
wherein the sealing means:
permits, in a first angular position, the fluid to pass from a first inlet to a first outlet of the valve and from a second inlet to a second outlet of the valve and, in a second angular position, to permit the fluid to pass from the first inlet to the second outlet through the body, and
ensures the gradual closing of the first inlet,
wherein said body comprises a cylindrical internal housing of circular cross section and said sealing means comprises two sealing parts arranged in a plane which is inclined relative to said cylindrical housing and cooperating with the lateral wall of said housing by a peripheral generatrix to ensure a sealed contact between the sealing means and the body in at least two angular positions, and
wherein said sealing parts each comprise an inclined part, located in parallel with one another and axially offset along the axis of the housing.

* * * * *